United States Patent [19]

Volkin

[11] 4,281,294
[45] Jul. 28, 1981

[54] DIRECT SOLAR PUMPED LASER

[76] Inventor: Howard C. Volkin, 405 Cheryl, Los Alamos, N. Mex. 87544

[21] Appl. No.: 30,008

[22] Filed: Apr. 16, 1979

[51] Int. Cl.³ .............................................. H01S 3/20
[52] U.S. Cl. ............................ 331/94.5 L; 331/94.5 P
[58] Field of Search ...................... 331/94.5 L, 94.5 P, 331/94.5 S; 350/164; 126/445, 900

[56] References Cited

U.S. PATENT DOCUMENTS

| | | | |
|---|---|---|---|
| 2,207,656 | 7/1940 | Cartwright et al. | 350/164 |
| 3,451,010 | 6/1969 | Maiman . | |
| 4,004,573 | 1/1977 | Frieling et al. | 126/900 |

OTHER PUBLICATIONS

"Transparent Heat Mirrors for Solar-Energy Applications", by Fan et al. *Applied Optics* vol. 15, No. 4, (Apr. 1976).
"Organic Laser Systems" in Lasers, vol. 1, pp. 203-211, (1966).
"Photon Trapping and Energy Transfer in Multiple-Dye Plastic Matrices: An Efficient Solar-Energy Concentrator", by Swartz et al., *Optics Lett.*, vol. 1, (Aug. 1977).
"Remarks on Negative Absorption" by Rautian et al., *Opt. Spect.*, vol. 10, pp. 65-66, (Jan. 1967).

*Primary Examiner*—William L. Sikes
*Assistant Examiner*—Leon Scott, Jr.
*Attorney, Agent, or Firm*—Paul D. Gaetjens

[57] ABSTRACT

A direct solar pumped laser operates on emission from the phosphorescent $T_1 \rightarrow S_o$ transition of a suitable dye molecule used in liquid or solid solution. The first excited singlet electronic state $S_1$ is excited from the ground state $S_o$ by light from solar concentrators absorbed in the absorption bands of the strong spin-allowed transitions $S_p \leftarrow S_o$, $p \geq 1$, where the primary absorption band is usually $p=1$. Excitation of dye molecules to the first triplet state $T_1$ occurs via intersystem crossing from $S_1$ to the triplet state manifold.

10 Claims, 6 Drawing Figures

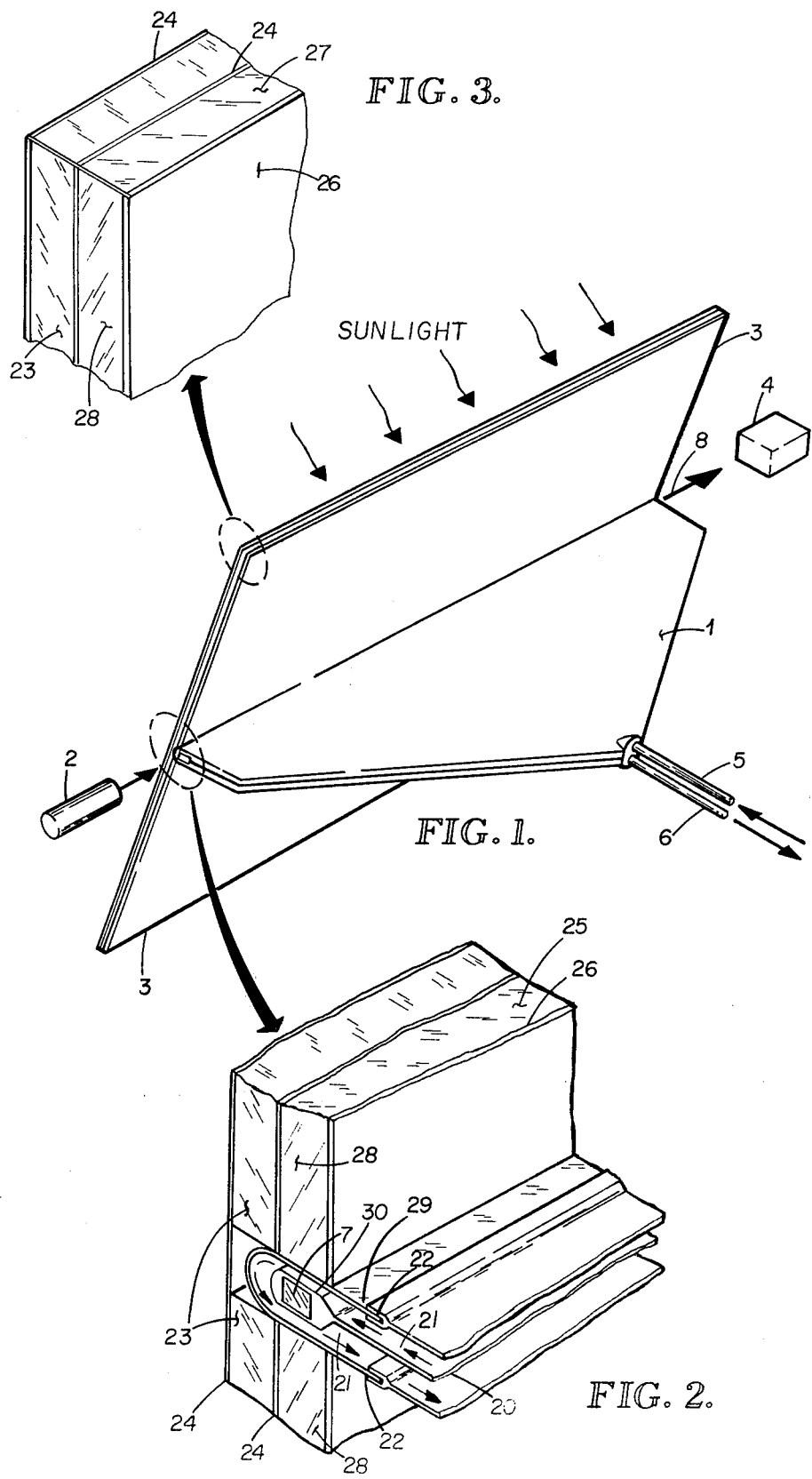

DIRECT SOLAR PUMPED LASER

BACKGROUND OF THE INVENTION

A. Field of the Invention

The direct excitation of large lasers by sunlight offers the prospect of a drastic reduction in the cost of coherent optical radiation for high average power applications. Up to now solar pumped lasers have not been viewed from this perspective. Solar optical excitation of the Nd:YAG laser has been developed for laser communication between space satellites. However, these small, low power devices ($\frac{1}{2}$ watt) have severe cooling requirements due to their low efficiency and are not suitable for scaling to high power. By contrast, this invention consists of a direct solar pumped laser capable of high average power output. In direct solar excitation, the laser itself is the energy conversion device. The spectrum of incident sunlight is an essentially thermal black body distribution (approximately 5800 K) modified by atmospheric scattering and absorption. The energy output is coherent light, which has a lower entropy, thus producing a higher form of energy. Large direct solar pumped lasers could be used for present laser applications in industrial machining and heating operations. Their use in industrial photochemistry and as optical excitation sources for other lasers would greatly enlarge the scale of these applications. Any significant reduction in the cost of laser light will not only expand the range of existing applications but will also open up entirely new ones. For example, new laser developments would evolve, since large volumes of high pressure gas ($\geq 10$ atm) can be efficiently pumped by laser light. Other examples include photovoltaic cells designed for optimum performance at a single optical frequency, which have significantly increased efficiency ($\sim 40\%$). Multijunction solar cells are edge illuminated and have the practical advantage of high output voltage. With incident light that is coherent, it becomes possible to focus the illumination so that it propagates only through the junction region of the cell. Not only would conversion efficiency be further enhanced, but the allowable light concentration would be dramatically increased. Heating due to recombination would be nearly eliminated. Moreover, when the semiconductor bandgap and the laser frequency are matched, heating from excess photon energy is greatly reduced. Multijunction solar cells might then be operated very efficiently at high power levels. Such developments would radically alter the solar photovoltaic concept from the current large arrays of essentially planar cells exposed to outdoor conditions to compact, high power "volume" devices that can be kept in a controlled environment because direct solar irradiance has been eliminated. Even more appealing is the application of solar powered lasers to the photoelectrolysis of water, where the generation of hydrogen automatically solves the energy storage problem. A coherent light beam can be focused to the high intensities at which nonlinear effects such as second harmonic generation are large enough to be used efficiently. The dissociation of water into hydrogen and oxygen by photoelectrolysis occurs at a much higher efficiency with light in the near uv compared to the visable. The frequency-doubled output from a solar pumped laser would provide an optimum irradiation source for the process. Probably the most exciting prospect for solar pumped lasers is the economical generation of hydrogen by photoelectrolysis.

To obtain a match between solar energy and the excitation of a laser system, two properties of sunlight are critical, namely, its broad continuous frequency distribution and its constant intensity over time intervals characteristic of laser action. With such a diffuse spectrum, only a small fraction of the total irradiant power resides in any small frequency interval. The active molecule of this laser invention must have an electronic absorption transition that lies in the intense (visible) part of the solar spectrum with a large total oscillator strength distributed over a wide continuum band. The steady intensity of the solar light source in time means that the medium must be pumped continually for highest efficiency. Efficient energy extraction dictates CW (continuous wave) or fast repetitively pulsed operation of the laser. Compounds having high absorption in the visible spectrum are generally called dyes. These are long organic molecules possessing several conjugated double bonds. The longest wavelength, spin allowed absorption band, $S_1 \leftarrow S_0$, of a dye molecule will generally meet the inventor's absorption requirements, especially in solution at normal temperature where the close-spaced vibrational structure of a vibronic band system is broadened into a continuum band with one or at most a few relatively broad peaks. Using this criteria, two classes of dye molecules chosen were aromatic hydrocarbons and organic dyestuffs. Organic dyestuff molecules contain a chromophoric system, characterized by a chain of conjugated double bonds within which the desired electronic transition takes place.

B. Prior Art

1. "Organic Laser Systems" in Lasers, vol. 1, pp. 203–211, 1966.

A. Lempicki et al. discuss the use of the phosphorescence transition of organic molecules for laser operation with flashlamp excitation. Coherent stimulated emission from the triplet state of aromatic organic phosphors had been reported, however, efforts to reproduce the reported results were not successful. These molecules were not suited for solar pumping because they absorb in the ultraviolet which comprises a small fraction of the solar spectrum.

2. U.S. Pat. No. 3,451,010, T. H. Maiman. FIG. 3 shows a means for optically pumping the laser material with sunlight energy using a lens and mirror to focus the light on the material.

3. Optics Letters, B. A. Swartz et al., vol. 1, pp. 73–75, August 1977. Multiple dye planar solar concentrators have been demonstrated using a plastic matrix.

4. Opt. Spektrosk, S. G. Rautian et al., vol. 10, pp 65–66, January 1961. Heavy-atom substitution to increase the quantum yield for phosphorescence in phosphorescence laser systems is suggested, but not in connection with the explicit use of and substitution in dye molecules.

In this invention suitable dye molecules are selected to have little or no absorption of laser emission. This invention is a direct solar pumped laser capable of high power output. A planar solar concentrator can be used as the sunlight collector to supply the pump light to the lasing medium.

SUMMARY OF THE INVENTION

A direct solar pumped laser system operates as an amplifier with laser emission from the phosphorescence transition $T_1 \rightarrow S_0$ of a suitable dye molecule. The electronic states of the laser molecule are designated $S_p$, the $p^{th}$ excited singlet state, and $T_q$, the $q^{th}$ triplet state. The dye molecule can be used in liquid or solid solution. Population inversion on the phosphorescence transition is produced as dye molecules in the ground electronic state $S_0$ absorb light from a solar collector-concentrator in strong transitions $S_p \leftarrow S_0$, $p \geq 1$. This absorption pumps the first excited singlet state $S_1$, and intersystem crossing from $S_1$ populates the first triplet state $T_1$. On the basis of the well established heavy-atom effect, heavy-atom substituted derivatives of dye and solvent molecules provide suitable dye-solvent systems for these lasers, with enhanced rates for intersystem crossing from $S_1$ and radiative transition from $T_1$. With a properly chosen dye molecule, laser operation occurs with little or no triplet-triplet absorption at the optimum laser frequency, which is in the near infrared or visible. With suitable molecules, the attainable gain coefficient at moderate solar concentration and at allowable dye density and the saturation intensity permit amplifier operation with appreciable power output. The flow requirements for cooling are moderate. Confinement of the amplified beam in a gain guided propagating mode within the narrow gain region makes simple optics adequate. A planar solar concentrator can be used as the collector.

BRIEF DESCRIPTION OF THE DRAWINGS

FIG. 1 is a perspective view of the direct solar pumped laser module with planar solar concentrator, input laser, and cooling system as described in the preferred embodiment.

FIG. 2 is an enlarged view of a rigid (solid) laser medium of FIG. 1 along with the associated cooling means.

FIG. 3 is an enlarged view of the edge of the planar solar concentrator of FIG. 1.

DESCRIPTION OF THE PREFERRED EMBODIMENT

Figure 5:
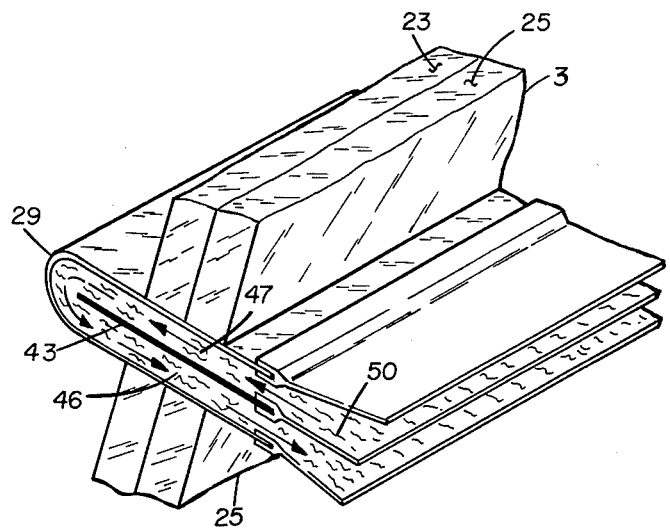
FIG. 5 is an enlarged view of the liquid dye chamber of FIG. 4.

FIG. 1 is a perspective view of a single direct solar pumped laser module with its planar solar concentrator 3 having cooling inlet 5 and outlet 6 connected to a pump means (not shown) which provides coolant circulation around a solid solution of the dye as the laser medium, said coolant being held in container 1, an input dye laser 2 (1 watt) being focused on the laser medium and the amplified solar powered laser beam 8 exiting and acting upon an appliance 4 capable of using the amplified coherent beam 8. Sunlight strikes the planar surface of the solar concentrator 3, which transforms and transmits this solar energy to the laser medium. The solar collector-concentrator 3 has a sheet of transparent plastic, containing luminescent dye molecules in solid solution within the plastic matrix, which absorbs and concentrates wavelengths of solar radiation shorter than or within the absorption band of the active molecule in the laser medium.

FIG. 2 is an enlarged view of FIG. 1 and shows laser medium 7 cooled by coolant flowing around divider 20 and in channels 21 with appropriate seals 22. A portion of concentrator 3 is shown with an approximately 1 mm thick glass or plastic window 23 which covers the collector medium 25 on its solar incidence side. The window 23 has an antireflection coating 24 on both of its planar sides while the luminescent collector medium 25, having an approximate thickness of 1 mm and width of 25 cm, has a metal reflector coating 26 such as aluminum on its back planar surface and side edges 28. The transparent member 29 of container 1 is the same plastic material used in the collector medium. The refractive index of the liquid coolant is chosen to give refractive-index matching between the collector medium 25 and the laser medium 7. The housing 30 holds the laser medium 7 which can be removed and replaced by new laser medium material after degradation of the material in use has occurred.

FIG. 3 is an enlarged end view of the upper corner of the solar concentrator 3. In particular, the antireflection coatings 24 are situated on the front and back surface of window 23 and a metal reflector coating 26, 27, and 28 covers the back planar surface, top and side edges of the collector medium 25.

Figure 4:
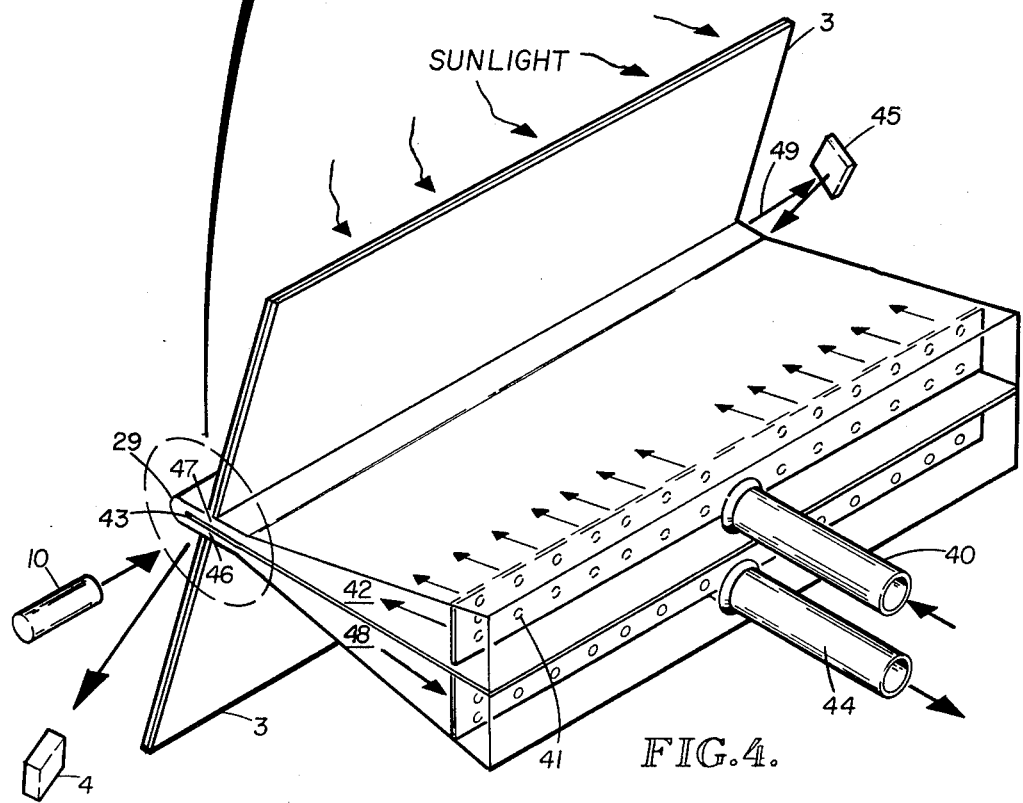
FIG. 4 is another embodiment showing a perspective view of the direct solar pumped laser using a liquid dye solution as the lasing medium, and having a reflector means situated at the end opposite the input laser.

FIG. 4 is a perspective view of another embodiment of this invention using a liquid dye-solvent solution as the laser medium. The dye solution enters inlet 40 and then through a perforated diffuser plate 41 into channels 42 and 48 formed by flow divider 43 and then back through the diffuser 41, outlet 44 to recirculating pump means (not shown). The upper member of solar concentrator 3 illuminates the gain region 47 through transparent part 29 and input driver laser 10 focuses on the side face of region 47, which is above divider 43. The amplified output beam 49 impinges on reflector 45, which causes the amplified beam to travel again through the laser medium (a double pass) but now in the region 46 below divider 43, which receives concentrated light from the lower member of solar concentrator 3, thus doubling the length of the laser medium traversed by the beam and increasing the power of the amplified beam 49 before it strikes the target 4.

FIG. 5 is an enlarged end view of the operating region of FIG. 4 with the clear plastic end piece removed (not shown) for ease of viewing. Liquid dye-solvent solution 50 flows into region 47 where the upper part of solar concentrator 3 and input driver laser 10 [FIG. 4] are focused. Collector medium 25 with protective window 23 and transparent part 29 allow the solar energy to be deposited into gain regions 47 and 46 on either side of divider 43. In the return loop of solution 50 to outlet 44 [FIG. 4], the solution 50 enters region 46. Gain region 46 illuminated by the lower part of collector medium 25 receives the amplified output beam of region 47 after the beam 49 [FIG. 4] impinges on reflector 45 (FIG. 4), thus doubling the length of gain medium through which the beam propagates.

Figure 6:
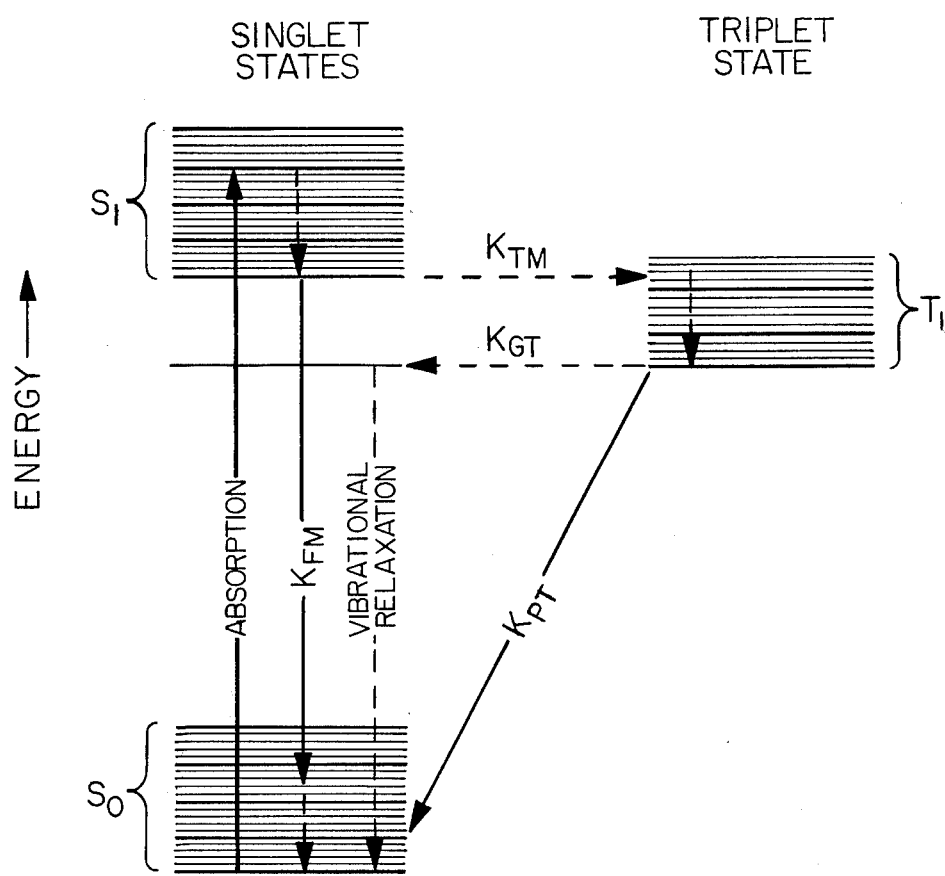
FIG. 6 is an energy level diagram of a dye laser molecule in solution and shows the important unimolecular photophysical processes.

FIG. 6 shows an energy level diagram of a dye laser molecule in solution and unimolecular photophysical processes. Heavy horizontal lines represent vibrational sublevels of the electronic states, while the lighter lines denote the broadening of these due primarily to interaction with solvent molecules. Radiative transitions are shown by solid lines, radiationless transitions by broken lines. $S_0$ is the ground electronic state, $S_1$ the first excited electronic state is reached by absorption of radiation from the solar concentrator, $T_1$ the first triplet electronic state is reached by intersystem crossing from $S_1$ with rate parameter $k_{TM}$, $k_{FM}$ is the spontaneous radiative decay rate per molecule for $S_1 \rightarrow S_0$ fluorescence, $k_{PT}$ is the spontaneous radiative decay rate per molecule for the phosphorescence $T_1 \rightarrow S_0$ transition, and $K_{GT}$ is the intersystem crossing rate parameter for radiationless transition $T_1 \rightarrow S_0$. After a molecule in liquid or solid solution undergoes an electronic transition, vibrational relaxation due to bimolecular interactions with the solvent environment rapidly thermalizes the vibrational energy in the new electronic state and is indicated by a dashed downward-directed vertical arrow. The decay rate of state $S_1$, due to all deactivation processes is $k_{s1}$ and that of state $T_1$, is $k_{t1}$.

Dye molecules are selected on the basis of their spectral features so that little or no absorption of laser emission, particularly by triplet-triplet absorption, occurs. Starting with such a molecule, it is generally necessary to use derivatives of the dye molecule or derivatives of its solvent molecule formed by (1) heavy-atom substitution, e.g., substitution of one or more of the hydrogen atoms by halogen atoms (fluorine F, chlorine Cl, bromine Br, and iodine I) and (2) by substitution of one or more hydrogen atoms by groups, e.g., alkyl (methyl $CH_3$, ethyl $C_2H_5$, propyl $C_3H_7$, etc.) and phenyl ($C_6H_5$) to increase the structural asymmetry. Such substitutions introduce more spin-orbit coupling which enhances the rates of the spin-forbidden processes: $k_{TM}$ most strongly, $k_{PT}$ usually less strongly, and possibly $k_{GT}$. But the substitutions do not much affect the spectral features or the rates of spin-allowed transitions. Typical values for unsubstituted "dye-laser" dyes are $k_{TM} \simeq 10^7 s^{-1}$ and spin-allowedness factor $f_S \simeq 10^{-6}$. In all cases the substitution is extensive enough to make the molecule nonfluorescent, i.e., to make $k_{TM}$ dominate the singlet decay rate: $k_{s1} \simeq k_{TM}$.

From their energy level assignments and spectral features, molecules are chosen on the basis of known electronic transition-rate characteristics in relation to molecular state properties and energy level spacings. In particular, triplet-triplet (T-T) absorption is avoided by selecting molecules whose triplet energy-level structure has favorable features, namely the maximum intensity of the phosphorescence band occurs either (1) at a wavelength longer or nearly longer than the $T_2 \leftarrow T_1$ absorption band, so that T-T absorption at the laser operating wavelength is energetically forbidden, or (2) at a wavelength that falls between the $T_2 \leftarrow T_1$ band and the $T_3 \leftarrow T_1$ band in a region where T-T absorption is sufficiently small. Property (1) requires that the $T_2$-$T_1$ energy level spacing be not appreciably smaller than the $T_1$-$S_0$ spacing, whereas (2) requires that the $T_3$-$T_1$ spacing be not appreciably smaller than the $T_1$-$S_0$ spacing.

In order to determine the essential features of laser designs over a broad range of possible conditions, the inventor has selected eight cases, as shown in Tables I and II. The first three are appropriate for liquid solutions. In case I moderate substitution has increased the value of $f_S$ to $2 \times 10^{-5}$ while the $T_1$ decay rate $k_{t1}$ has not increased beyond the value $10^4$. More extensive substitution in the next two cases has increased $f_S$ to $2 \times 10^{-4}$, and $k_{t1}$ becomes $10^5$ in case II but does not exceed $10^4$, the typical value in liquid solutions, in case III. In case I the total rate parameter $k_{TT}$ for interaction between active molecules in the state $T_1$ is small, whereas in Cases II and III it is large.

TABLE I

| | | C | $k_{t1}$ | $f_s$ | $g_o$ |
|---|---|---|---|---|---|
| I | fluid ($k_{TT} \lesssim 10^7 M^{-1}s^{-1}$) | 400 | $10^4$ | $2 \times 10^{-5}$ | $5 \times 10^{-4}$ |
| II | fluid ($k_{TT} = 10^9 M^{-1}s^{-1}$) | 400 | $10^5$ | $2 \times 10^{-4}$ | $5 \times 10^{-4}$ |
| III | fluid ($k_{TT} = 10^9 M^{-1}s^{-1}$) | 400 | $10^4$ | $2 \times 10^{-4}$ | $10^{-3}$ |
| IV | rigid or fluid ($k_{TT} \lesssim 10^7 M^{-1}s^{-1}$) | 100 | $10^3$ | $2 \times 10^{-5}$ | $10^{-3}$ |
| V | rigid or fluid ($k_{TT} \lesssim 10^7 M^{-1}s^{-1}$) | 200 | $10^4$ | $10^{-4}$ | $10^{-3}$ |
| VI | rigid | 100 | $10^2$ | $2 \times 10^{-5}$ | $2 \times 10^{-3}$ |
| VII | rigid | 200 | $10^3$ | $10^{-4}$ | $6 \times 10^{-3}$ |
| VIII | rigid | 100 | $10^3$ | $2 \times 10^{-4}$ | $10^{-2}$ |

TABLE II

Table II Input intensity $I_i = 100$ w/cm$^2$ cw. $I_s$, saturation intensity; $L_s$, distance through gain medium to reach the intensity $I_s$; $L_p$, distance through gain medium to reach power P from 1 mm$^2$ aperture of gain region.

| | | | Lp(m) | | | |
|---|---|---|---|---|---|---|
| | $I_s$(w/cm$^2$) | $L_s$(m) | P = 50 w | P = 100 w | P = 500 w | P = 1000 w |
| I | $7.55 \times 10^5$ | 199 | 78.4 | 92.4 | 126 | 141 |
| II | $7.55 \times 10^5$ | 199 | 78.4 | 92.4 | 126 | 141 |
| III | $7.55 \times 10^4$ | 76.3 | 39.8 | 47.4 | 68.8 | 82.3 |
| IV | $7.55 \times 10^4$ | 76.3 | 39.8 | 47.4 | 68.8 | 82.3 |
| V | $1.51 \times 10^5$ | 83.2 | 39.4 | 46.7 | 65.5 | 75.7 |
| VI | $7.55 \times 10^3$ | 26.6 | 22.8 | 29.6 | 64.1 | 101 |
| VII | $1.51 \times 10^4$ | 10.0 | 7.06 | 8.77 | 15.9 | 22.5 |
| VIII | $7.55 \times 10^3$ | 5.31 | 4.56 | 5.92 | 12.8 | 20.1 |

Cases IV and V are applicable to a solid solution or to a liquid solution with small triplet-triplet interaction, with a moderately substituted molecule having $f_S = 2 \times 10^{-5}$, $k_{t1} = 10^3$ in the former case and a more extensively substituted molecule having $f_S = 10^{-4}$, $k_{t1} = 10^4$ in the latter case. The last three cases VI–VIII apply mainly to a solid solution. Moderate substitution has brought $f_S$ to $2 \times 10^{-5}$ while $k_{t1}$ ends up at $10^2$ in case VI. Substitution is carried further to increase $f_S$ to $10^{-4}$ in case VII and to $2 \times 10^{-4}$ in case VIII while $k_{t1}$ does not exceed $10^3$ in either case. The gain coefficients $g_0$ in Table I are based on a dye concentration of $6 \times 10^{17}$ cm$^{-3}$ ($10^{-3}$ M), a value for which the rate of concentration (self) quenching of both the $S_1$, state and the $T_1$ state is small. The concentration levels of impurities, particularly oxygen, are kept low enough that impurity quenching of $T_1$ is sufficiently small to permit the indicated value of $k_{t1}$. The solar concentration C is referenced to the radiant intensity and spectrum of direct sunlight (at air mass m = 1) as is appropriate for a passive optical collector-concentrator.

Table III lists five selected laser systems in order of preference. The active molecule is a heavy-atom substituted derivative of the dye molecule listed in the first column. The preferred embodiment uses Rhodamine 6G in a solid solution. The solvent for the liquid-solution version of each case is given in the second column, while the rigid matrix within which the active molecules are dissolved in the solid solution is the plastic PMMA (polymethyl methacrylate) for each case. The laser operating wavelength is $\lambda_0$ (nanometers). The input laser for amplifier operation at wavelength $\lambda_0$ is a dye laser employing the molecule shown in the fifth column. The collector-concentrator is specified for each system in the sixth column.

TABLE III

| ACTIVE MOLECULE DERIVED FROM | FLUID SOLVENT | RIGID MATRIX | $\lambda_o$ (nm) | INPUT DYE LASER | SOLAR COLLECTOR-CONCENTRATOR |
| --- | --- | --- | --- | --- | --- |
| Rhodamine 6G | Propyl Alcohol +20% (by volume) $CHBr_3$ | PMMA | 695 | Cresyl Violet | PSC-Coumarin 30 |
| DTDC Iodide | Ethylene Glycol | PMMA | 1015 | Xenocyanine | PSC-Rhodamine B |
| Acridine Orange | Ethyl Alcohol/Ether | PMMA | 645 | Rhodamine 101 | PSC-Coumarin 102 |
| Tetracene | Benzene | PMMA | 971 | IR 140 | Parabolic Trough |
| Fluorescein | Ethyl Alcohol/Ether | PMMA | 637 | Rhodamine B | Parabolic Trough |

For the planar solar concentrator (PSC), a fluorescent molecule whose emission from the PSC matches the absorption band of the active molecule is specified. In the case of active molecules derived from Rhodamine 6G, Acridine Orange and Fluorescein, $\lambda_0$ is chosen to fall between the $T_2 \leftarrow T_1$ and the $T_3 \leftarrow T_1$ absorption bands. For the active molecules based on DTDC Iodide (the thiacyanine dye having four conjugated double bonds in its chromophore, 3,3'-diethylthiadicarbocyanine) and on the aromatic hydrocarbon tetracene, $\lambda_0$ exceeds the long wavelength edge of the $T_2 \leftarrow T_1$ absorption band so that triplet-triplet absorption at $\lambda_0$ is energetically forbidden. In tetracene the $T_2$ level lies below the $S_1$ level and the $T_2$-$T_1$ and $T_1$-$S_0$ spacings are nearly equal, making all absorptive transitions from $T_1$ energetically forbidden at the wavelength of the phosphorescence maximum.

The following critical features characterize this invention:

1. The laser medium is a solid or liquid solution of the active molecules.

2. The active-molecule species is a compound of the type commonly called a dye molecule. A dye molecule absorbs strongly from the ground electronic state $S_0$ in one or more continuum absorption bands that lie in the visible frequency region, where the solar spectrum is most intense. These absorption bands are strong spin-allowed singlet-singlet vibronic bands, and the primary absorption band usually corresponds to the electronic transition $S_1 \leftarrow S_0$ to the first excited singlet state $S_1$.

3. The lasing transition is the phosphorescence transition of the active molecule, $T_1 \rightarrow S_0$, from the first triplet electronic state $T_1$. The state $T_1$ is excited by radiationless transition, called intersystem crossing, from $S_1$. Depending upon the particular dye molecule employed, laser operation will occur in the near infrared or the visible.

4. Direct solar pumping is used, in which excitation of the active molecules occurs by their absorbing concentrated light from a solar collector-concentrator. The solar collector can be one or more passive optical concentrators, e.g., parabolic trough reflectors, or the preferred collector, one or more planar solar concentrators (PSC) matched to the active molecule in that the luminescent emission band of the PSC well overlaps the primary absorption band of the active molecule. The PSC employs "light-pipe" trapping of luminescence (from fluorescent molecules excited by the absorption of incident sunlight). When the emission from the PSC matches the laser dye, absorption of the pump light tends to be confined to ground state absorption and heating of the laser medium is reduced. With the PSC collector, steering to track the sun is not required, diffuse as well as direct solar radiation is utilized, and exposure of the laser dye molecules to the ultraviolet component of sunlight is eliminated without the need for optical filters.

5. The active molecules are derivative dye molecules whose rate parameters for the two critical spin-forbidden transitions, namely, intersystem crossing from $S_1$ and the phosphorescence radiative transition $T_1 \rightarrow S_0$, are significantly increased from the corresponding rate parameters of the unsubstituted dye molecule. The active molecules are derived by the substitution of heavy atoms in the dye molecule (the internal heavy-atom effect) and possibly also by the substitution of groups of atoms to increase the asymmetry of the molecular structure. The positions in the dye molecule at which substitution is favored are those which produce the largest increase of $k_{TM}$ and $k_{PT}$ relative to any increase of $k_{GT}$. Similar substitution in the solvent molecule of a dye-solvent system and the addition to the solution of species containing heavy atoms (the external heavy-atom effect) also enhance these two spin-forbidden transitions. The substitution does not greatly alter the energy level structure and the rate parameters of spin-allowed transitions from that of the unsubstituted dye molecule. But the substitution enhances laser gain by increasing the stimulated emission cross section for the lasing transition and by increasing the population in the $T_1$ state through faster intersystem crossing from $S_1$ into the manifold of triplet states.

6. A suitable active molecule is selected on the basis of its spectral features so that the peak of the phosphorescence emission band is not overlapped by a strong absorption band, particularly a triplet-triplet absorption band. The optimum frequency for laser operation is that at which the net gain is a maximum. The net gain at a particular frequency is the algebraic sum of the positive gain for stimulated emission on the lasing transition and the negative gain due to absorptive transitions, if any, at that frequency. The optimum frequency is that at which the difference between the two relevant cross sections, i.e., the stimulated emission cross section (of the substituted dye molecule) minus the net absorption cross section, has its largest value. A dye molecule is suitable for our laser system if at the optimum frequency the stimulated emission cross section is near its peak value and the absorption cross section is relatively small. With a suitable active molecule the absorption of laser emission is negligible or relatively small at the optimum frequency.

7. The total concentration N of active molecules is kept small enough that concentration (self) quenching of both the $S_1$ state and the $T_1$ state is small. The upper limit on N from this consideration is generally no smaller than $6 \times 10^{f} cm^{-3}$ ($10^{-3}$ M). By controlling impurity level concentrations, impurity quenching of the $S_1$ state is kept small and impurity quenching of the $T_1$ state is kept sufficiently small to attain the desired population in the $T_1$ state. The rate of triplet-triplet interaction between active molecules in the $T_1$ state can be reduced by using a more viscous fluid solvent or by using a solid (rigid matrix) solution. In a solid solution the diffusion-controlled collisional processes of interaction between active molecules in the $T_1$ state and of impurity quenching of the $T_1$ state are greatly inhibited, the triplet decay rate $k_{t1}$ can be near its minimal value (the unimolecular rate), and the triplet concentration is enhanced thereby.

8. In amplifier operation of the laser, the driver is a low powered laser operating at the desired frequency and generally with cw output. Tunability over a frequency interval containing the optimum frequency is obtained simply by using a tunable input laser, such as a dye laser, that covers the desired frequency range.

9. The laser beam traverses the gain region of the laser medium in a gain-guided propagation mode, whereby the beam is effectively confined along its path length through the laser medium to the cross-sectional area of the gain region. Consequently, simple optics with minimal alignment requirements are adequate for any length of optical path through the laser medium.

The description presented heretofore has shown a direct pumped solar laser system consisting of one or more modules. Attainable gains at moderate solar concentrations and allowable dye concentrations are sufficient for useful laser operation. The physical principles of this invention include the heavy-atom effect that enables dye-solvent systems suitable for the solar pumped laser to be derived, with the dye molecule selected on the basis of its spectral features to have little or no absorption of laser emission on other transitions (particularly triplet-triplet absorption) giving adequate laser gain at the optimum operating frequency, some specific molecules that satisfy the criteria are identified, efficiency is enhanced by large values of the parameter $(k_{TM}C/k_{t1})$ to obtain large triplet concentrations and, equivalently, by large values of the quantity $(f_S/k_{t1})$ to obtain high gain and low saturation intensity. Basic design considerations are developed for laser amplifier operation and the operating characteristics are derived at eight selected cases. Moderate cooling flow is adequate. Simple optics suffice because of the gain guided beam propagation through the narrow gain region of the laser, and as a source of pump light, the planar solar concentrator has a very good geometrical and frequency match. Taken together, the various features of the direct solar pumped laser described here offer a device of unprecedented simplicity capable of producing coherent light at greatly reduced cost.

GLOSSARY OF CHEMICAL TERMS

The chemical terms used in this application are defined as follows:

Rhodamine 6G: Benzoic acid, 2-[6-(ethylamino)-3-(ethylimino)-2,7-dimethyl-3H-xanthen-9-yl]-, ethyl ester, monohydrochloride $C_{28}H_{30}N_2O_3 \cdot ClH$ DTDC: Benzothiazolium, 3-ethyl-2-[5-(3-ethyl-2(3H)benzothiazolylidene)-1,3-pentadienyl]- $C_{23}H_{23}N_2S_2$ Acridine Orange: 3,6-Acridinediamine, N,N,N',N'-tetramethyl-, monohydrochloride, compd. with zinc chloride $C_{17}H_{19}N_3 \cdot xCl_2Zn \cdot ClH$ Tetracene: Napthacene $C_{18}H_{12}$ Fluorescein: Spiro[isobenzofuran-1(3H),9'-[9H]xanthen]-3-one, 3', 6'-dihydroxy- $C_{20}H_{12}O_5$ Cresyl Violet: 5H-Benzo[a]phenoxazin-9-amine, 5-imino-N,N,10-trimethyl-, monohydrochloride $C_{19}H_{17}N_3O \cdot ClH$ Xenocyanine: Quinolinium, 1-ethyl-4-[7-(1-ethyl-4(1H)-quinolinylidene)-1,3,5-heptatrienyl]- $C_{29}H_{29}N_2$ Rhodamine 101: 9-(2-carboxyphenyl)-2,3,6,7,12,13,16,17-octahydro-1H,5H,11H,15H-xantheno[2,3,4-ij:5,6,7,-i'j']diquinolizin-4-ium $C_{32}H_{31}N_2O_3$ IR 140: Benzothiazolium, 5-chloro-2-[2-[3-[(5-chloro-3ethyl-2(3H)-benzothiazolylidene)ethylidene]-2-(diphenylamino)-1-cyclopenten-1-yl]ethenyl]-3-ethyl-, perchlorate $C_{39}H_{34}Cl_2N_3S_2 \cdot ClO_4$ Rhodamine B: Ethanaminium, N-[9-(2-carboxyphenyl)-6-(diethylamino)-3H-xanthen-3-ylidene]-N-ethyl-,chloride $C_{28}H_{31}N_2O_3 \cdot Cl$ Coumarin 30: 2H-1-Benzopyran-2-one, 7-(diethylamino)-3-(1-methyl-1H-benzimidazol-2-yl)- $C_{21}H_{21}N_3O_2$ Coumarin 102: 1H,5H,11H-[1]Benzopyrano[6,7,8-ij]quinolizin-11-one, 2,3,6,7-tetrahydro-9-methyl- $C_{16}H_{17}NO_2$

What is claimed is:

1. A direct solar-pumped laser having a power output and comprising in combination:
   (a) means for collecting and concentrating solar energy into a laser medium, said medium consisting of an active heavy-atom substituted dye molecule in solution, the said solar laser operation occurring on the phosphorescence transition of the active dye molecule,
   (b) said active dye molecule having an intersystem crossing rate from its first excited singlet electronic state and a phosphorescence band intensity maximum that are enhanced over that of an unsubstituted dye molecule, and having relatively little triplet-triplet absorption occurring from its first triplet state at wavelengths in the spectral region of the phosphorescence intensity maximum, and
   (c) a low-powered input laser at a desired frequency whose laser beam provides a driver signal for amplifier operation of the said solar-pumped laser.

2. The laser medium of claim 1 in which the said medium is a solid solution of at least one active heavy-atom substituted dye molecule selected from the class consisting of rhodamine 6G, DTDC iodide, acridine orange, tetracene, and fluorescein, dissolved in polymethyl methacrylate.

3. The laser medium of claim 2 in which the solid solution of a dye molecule is rhodamine 6G dissolved in polymethyl methacrylate.

4. The means for collecting and concentrating the solar energy of claim 1 in which the means consists of one or more planar-solar concentrators containing active dye molecules in a plastic matrix and positioned so that their luminescent emission illuminates and excites the laser medium.

5. The input laser of claim 1 in which said laser is a CW tunable dye laser operating with at least one dye-laser molecule selected from the class consisting of cresyl violet, xenocyanine, rhodamine 101, IR 140, and rhodamine B.

6. The laser medium of claim 1 in which the said medium is a liquid solution of at least one heavy atom substituted dye molecule selected from the class consisting of rhodamine 6G dissolved in propyl alcohol plus 20% by volume $CHBr_3$, DTDC iodide dissolved in ethylene glycol, acridine orange dissolved in ethyl alcohol/ether, tetracene dissolved in benzene, and fluorescein dissolved in ethyl alcohol/ether.

7. The laser medium of claim 6 in which the selected solvent for each dye molecule has been heavy-atom substituted.

8. The laser medium of claim 6 or 7 in which the medium is situated above and below a divider and a reflector means for directing the said power output back through the laser medium situated below the said divider.

9. The laser medium of claim 6 in which the liquid solution is rhodamine 6G dissolved in propyl alcohol plus 20% by volume $CHBr_3$.

10. The laser medium of claim 9 in which the propyl alcohol is heavy-atom substituted.

* * * * *